(12) United States Patent
Muller et al.

(10) Patent No.: US 6,214,920 B1
(45) Date of Patent: Apr. 10, 2001

(54) POLYHYDROXYALKANOATE MOLDING COMPOSITIONS

(75) Inventors: Edward Muller, Westport, CT (US); Daniel Horowitz, Somerville; Anna Egozy, Lexington, both of MA (US)

(73) Assignee: Metabolix, Inc., Cambridge, MA (US)

( * ) Notice: Subject to any disclaimer, the term of this patent is extended or adjusted under 35 U.S.C. 154(b) by 0 days.

(21) Appl. No.: 09/587,745

(22) Filed: Jun. 5, 2000

Related U.S. Application Data

(63) Continuation of application No. 09/120,940, filed on Jul. 22, 1998, now Pat. No. 6,071,998.
(60) Provisional application No. 60/053,380, filed on Jul. 22, 1997.

(51) Int. Cl.$^7$ ...................................... C08K 3/00
(52) U.S. Cl. .................. 524/494; 524/439; 524/440; 524/441; 524/442; 524/444; 524/445
(58) Field of Search ................................ 524/444, 494, 524/439, 440, 441, 442, 445

(56) References Cited

U.S. PATENT DOCUMENTS

| | | |
|---|---|---|
| 4,698,375 | 10/1987 | Dorman et al. . |
| 4,826,493 | 5/1989 | Martini et al. . |
| 4,876,331 | 10/1989 | Doi . |
| 4,880,592 | 11/1989 | Martini et al. . |
| 4,910,145 | 3/1990 | Holmes et al. . |
| 4,968,611 | 11/1990 | Traussnig . |
| 5,155,158 | 10/1992 | Kim . |
| 5,213,976 | 5/1993 | Blauhut et al. . |
| 5,245,023 | 9/1993 | Peoples et al. . |
| 5,286,842 | 2/1994 | Kimura . |
| 5,292,860 | 3/1994 | Shiotani et al. . |
| 5,412,062 | 5/1995 | Power et al. . |
| 5,461,139 | 10/1995 | Gonda et al. . |
| 5,480,794 | 1/1996 | Peoples et al. . |
| 5,512,669 | 4/1996 | Peoples et al. . |
| 5,516,883 | 5/1996 | Hori et al. . |
| 5,534,432 | 7/1996 | Peoples et al. . |
| 5,563,239 | 10/1996 | Hubbs et al. . |

FOREIGN PATENT DOCUMENTS

| | | |
|---|---|---|
| 9302312 | 2/1995 | (BR) . |
| 2006508 | 8/1990 | (CA) . |
| 195 33 459 C1 | 11/1996 | (DE) . |
| 0 463 769 A2 | 1/1992 | (EP) . |
| 0 584 613 A1 | 3/1994 | (EP) . |
| 7-79788 | 3/1995 | (JP) . |
| 7-135985 | 5/1995 | (JP) . |
| 8-290975 | 11/1996 | (JP) . |
| 91/08993 | 6/1991 | (WO) . |
| 93/05093 | 3/1993 | (WO) . |
| 93/23554 | 11/1993 | (WO) . |
| 94/11440 | 5/1994 | (WO) . |
| 95/15260 | 6/1995 | (WO) . |
| 95/20614 | 8/1995 | (WO) . |
| 95/20615 | 8/1995 | (WO) . |
| 96/17369 | 6/1996 | (WO) . |
| 96/20621 | 7/1996 | (WO) . |
| 97/08931 | 3/1997 | (WO) . |

OTHER PUBLICATIONS

Abe et al., "Biosynthesis from gluconate of a random copolyester consisting of 3–hydroxybutyrate and medium–chain–length 3–hydroxyalkanoates by *Pseudomonas sp.* 61–3," *Int. J. Biol. Macromol.* 16:115–19 (1994).

Agostini, et al., "Synthesis and Characterization of Poly–β–Hydroxybutyrate. I. Synthesis of Crystalline DL Poly–β–Hydroxybutyrate from DL– β–Butyrolactone," *Polym. Sci.*, Part A–1 9:2775–87 (1971).

Amos & McInerney, "Composition of poly–β–hydroxyalkanoate from *Syntrophomonas wolfei* grown on unsaturated fatty acid substrates," *Arch. Microbiol.* 155:103–106 (1991).

Brandl, et al., "Ability of the phototrophic bacterium *Rhodospirillum rubrum* to produce various poly (beta–hydroxyalkanoates): potential sources for biodegradable polyesters," *Int. J. Biol. Macromol.* 11:49–55 (1989).

Byrom, "Miscellaneous Biomaterials," in *Biomaterials* (D. Byrom, ed.) pp. 333–359 MacMillan Publishers: London, 1991.

De Smet, et al., "Characterization of intracellular inclusions formed by *Pseudomonas oleovorans* during growth on octane," *J. Bacteriol.* 154:870–78 (1983).

Dubois, et al., "Macromolecular Engineering of Polylactones and Polylactides. 12. Study of the Depolymerization Reactions of Poly (ε–caprolactone) with Functional Aluminum Alkoxide End Groups," *Macromolecules* 26:4407–12 (1993).

German & Bose, "Injection Molding of Metals and Ceramics," Metal Powder Industries Federation: Princeton, 1997.

German, *Powder Injection Molding* Metal Powder Industries Federation: Princeton, 1990.

German, *Sintering Theory and Practice* John Wiley & Sons: New York, 1996.

Gross, et al., "Polymerization of β–Monosubstituted–β–propiolactones Using Trialkylaluminum–Water Catalytic Systems and Polymer Characterization," *Macromolecules* 21:2657–68 (1988).

(List continued on next page.)

Primary Examiner—Edward J. Cain
(74) Attorney, Agent, or Firm—Arnall Golden & Gregory, LLP

(57) ABSTRACT

Molding compositions including polyhydroxyalkanoates are provided. The use of polyhydroxyalkanoates as a binder in molding compositions provides improved binder removal in the finished molded product, and offers a wide range of physical properties suitable for use in a variety of processing conditions. The composition preferably includes a powdered material, such as a metal powder, ceramic powder, or blend, admixed with a polyhydroxyalkanoate binder. The compositions are useful in powder processing techniques, such as injection molding, slip casting, tape casting, or extrusion.

16 Claims, No Drawings

OTHER PUBLICATIONS

Hocking & Marchessault, "Biopolyesters" in *Chemistry and Technology of Biodegradable Polymers*, (G.J.L. Griffin, ed.), pp. 48–96, Chapman and Hall: London, 1994.

Hocking & Marchessault, "Syndiotactic poly[(R, S)-β-hydroxybutyrate] isolated from methylaluminoxane-catalyzed polymerization," *Polym. Bull.* 30:163–70 (1993).

Holmes, "Biologically Produced (R)-3-hydroxyalkanoate Polymers and Copolymers," in *Developments in Crystalline Polymers* (Bassett, ed.), pp. 1–65, Elsevier: London, 1988.

Hori, et al., "Ring–Opening Copolymerization of Optically Active β–Butyrolactone with Several Lactones Catalyzed by Distannoxane Complexes: Synthesis of New Biodegradable Polyesters," *Macromolecules* 26:4388–90 (1993).

Hori, et al., "Ring–Opening Polymerization of Optically Active β–Butyrolactone Using Distannoxane Catalysts: Synthesis of High Molecular Wright Poly(3–hydroxybutyrate)," *Macromolecules* 26:5533–34 (1993).

Horsch, et al., "Inheritance of Functional Foreign Genes in Plants" *Science* 223: 49–498 (1984).

Jesudason & Marchessault, "Synthetic Poly[(R, S)–β–hydroxyalkanoates] with Butyl and Hexyl Side Chains," *Macromolecules* 27:2595–602 (1994).

Kato, et al., "Production of a novel copolyester of 3–hydroxybutyric acid with a medium–chain–length 3–hydroxyalkanoic acids by *Pseudomonas sp.* 61–3 from sugars," *Appl. Microbiol. Biotechnol.* 45:363–70 (1996).

Kemnitzer, et al., "Preparation of predominantly Syndiotactic Poly(β –hydroxybutyrate) by the Tributylin Methoxide Catalyzed Ring–Opening Polymerization of racemic β–Butyrolactone," *Macromolecules* 26:1221–29 (1993).

Kharas, et al., "Polymers of Lactic Acid" in *Plast. Microbes* (Mobley, ed.), pp. 93–137, Hanser: Munich, 1994.

Lafferty, et al., "Microbial Production of Poly–b–hydroxybutyric acid," in *Biotechnology* (Rehm, et al., eds.), pp. 135–176, Verlagsgesellschaft: Weinheim, 1988.

Le Borgne, et al., "Stereoelective polymerization of β–butyrolactone," *Polymer* 30:2312–2319 (1989).

Lee, et al., "Biosyntheis of copolyesters consisting of 3–hyroxybutyric acid and medium chain length 3–hydroxyalkanoic acids from 1,3–butanediol or from 3–hydroxybutyrate by *Pseudomonas sp.* A33," *Appl. Microbiol. Biotechnol.* 42:901–909 (1995).

Lemoigne & Roukhelman, "Fermetation β–Hydroxybutyrique Caracterisation et Evolution Des Produits de Deshydration et de Polymerisation de L'acide β–Dehydroxybutyrique," *Annales des fermentations* 5:527–36 (1925).

Mitomo, et al., *Reports on Progress in Polymer Physics in Japan* 37:128–29 (1994).

Müller, et al., "Poly(hydroxyalkanoates): A Fifth Class of Physiologically Important Organic Biopolymers," *Angew. Chem. Int. Ed. Engl.* 32: 477–502 (1993).

Steinbüchel, et al., "A Pseudomonas strain accumulating polyesters of 3–hydroxybutyric acid and medium–chain–length 3–hydroxyalkanoic acids," *Appl. Microbiol. Biotechnol.* 37:691–97 (1992).

Steinbüchel & Valentin, "Diversity of bacterial polyhydroxyalkanoic acids," *FEMS Microbiol. Lett.* 128:219–28 (1995).

Steinbüchel, "Polyhydroxyalkanoic Acids," in *Biomaterials* (D. Byrom ed.), pp. 123–213, MacMillan Publishers: London, 1991.

Tanahashi, et al., "Thermal Properties and Stereoregularity of Poly(3–hydroxybutyrate) Prepared from optically Active β–Butyrolactone with a Zinc–Based Catalyst," *Macromolecules* 24:5732–33 (1991).

Valentin, et al., "Identification of 4–hydroxyhexanoic acid as a new constituent of biosynthetic polyhydroxyalkanoic acids from bacteria," *Appl. Microbiol. Biotechnol.* 40:710–16 (1994).

Valentin, et al., "Identification of 5–hydroxyhexanoic acid, 4–hydroxyaheptanoic acid and 4–hydroxyoctanoic acid as new constituents of bacterial polyhydroxyalkanoic acids," *Appl. Microbiol. Biotechnol.* 46:261–67 (1996).

Valentin, et al., "Identification of 4–hydroxyvaleric acid as a constituent of biosynthetic polyhydroxyalkanoic acids from bacteria," *Appl. Microbiol. Biotechnol.* 36: 507–14 (1992).

Wallen & Rohwedder, "Poly–β–hydroxyalakaonate from Activated Sludge," *Environ. Sci. Technol.* 8:576–79 (1974).

Williams, et al., "Biodegradable plastics from plants," *Chemtech* 26:38–44 (1996).

Xie, et al., "Ring–opening Polymerization of β –Butyrolactone by Thermophilic Lipases," *Macromolecules* 30:6997–98 (1997).

POLYHYDROXYALKANOATE MOLDING COMPOSITIONS

CROSS-REFERENCE TO RELATED APPLICATIONS

This is a continuation of U.S. Ser. No. 09/120,940 filed Jul. 22, 1998, now U.S. Pat. No. 6,071,998, which claims priority to U.S. Provisional application Ser. No. 60/053,380, filed Jul. 22, 1997.

BACKGROUND OF THE INVENTION

The present invention is generally in the field of compositions for forming molding articles, and more particularly to compositions including powdered forms of glass, ceramic, metals, and thermoplastics.

A variety of useful molded products having complex shapes and useful mechanical strengths can be made from powdered forms of ceramics, metals, metal oxides, thermoset resins, high melt temperature thermoplastics, and combinations thereof. Examples of these products include aerospace components, biomedical implants, bonded diamond abrasives, cutting tools, engine and other mechanical parts, nozzles subject to continuous contact with abrasives, electronic devices, and superconductors. Forming techniques, such as slip casting, tape casting, extrusion, injection molding, dry pressing and screen printing, generally require the presence of a binder formulation that is mixed with the metal, ceramic, or mixed powder feed. The binder is a temporary vehicle for homogeneously packing the powder into the desired shape and then for holding the particles in that shape until the beginning of sintering (German, "Powder Injection Molding," (Metal Powder Industries Federation, Princeton, N.J. 1990); German and Bose, "Injection Molding of Metals and Ceramics," (Metal Powder Industries Federation, Princeton, N.J. 1997)). Sintering, or fusing, of the powder components is needed, for example, to obtain physical properties for the finished item that are suitable for the conditions of its end use. Sintering is an important process for thermoplastic resins, such as polyimides and fluoropolymers, that do not have a well-defined melt phase (Strong, "Plastics: Materials and Processing," (Prentice-Hall, Inc., Englewood Cliffs, N.J. 1996)).

One disadvantage with using traditional binders in the shape formation is that the molded product's physical properties and performance can be impaired by residual amounts of binder or binder decomposition products, by uneven removal of binder or binder decomposition products, or by voids formed by removal of binder or binder decomposition products. (Residual binder is not a problem in the limited circumstances when it is desirable to incorporate binder components into the final form by chemical or interatomic attraction.) Many products made from ceramic powders, metal powders, and blends thereof are used in applications where they are exposed to repeated stresses. Examples of these products include combustion engine parts, valves, rotors, and gear assemblies. Inclusion bodies derived from inadequate removal of binder, or voids resulting from combustion gases during removal, can facilitate cracking and failure of the parts in service. Electrical conductivity is another important performance requirement, for example in electronic parts such as printed circuit boards and superconductors, that can be adversely affected by inadequate binder removal or void formation caused thereby. Therefore, removal of the binder used in shape formation is generally a crucial step in the powder processing technique.

Techniques for the removal of undesirable binders include (1) thermal evaporation; (2) thermal decomposition; (3) chemical transformation to forms useful in the end product; (4) solvent extraction; (5) supercritical extraction; (6) diffusion and absorption of binder constituents to an absorbing surface surrounding the shape or wicking; and (7) depolymerization by thermal means, catalytic means, or a combination thereof. Removal of the binder usually is the slowest step in the powder injection molding process (German, "Sintering Theory and Practice," (John Wiley & Sons, N.Y. 1996); German and Bose, "Injection Molding of Metals and Ceramics," (Metal Powder Industries Federation, Princeton, N.J. 1997)). One binding system investigated for providing more rapid removal involves using polyacetals, particularly with injection molding processing, for example, as described in U.S. Pat. No. 5,155,158 to Kim and in WO 91/08993. The use of polyalkylene carbonates for use in such applications is disclosed in European Patent Application EP 0,463,769 A2. In theory, the polyacetal binders "unzip" or depolymerize, releasing formaldehyde, when exposed to nitric acid fumes in an incubator. Similarly, the polyalkylene carbonate binders "unzip" upon reaching a certain decomposition temperature, typically around 200° C. Unfortunately, the use of nitric acid or other oxidants restricts the use of the polyacetals to those powders which are not susceptible to undesirable oxidation.

Other binder materials include polyoxalate and polymalonate polymers, which also are useful as rheological control agents in paste formulations, as described in U.S. Pat. No. 5,412,062 to Power et al. Polyalkylene carbonates, however, exhibit viscosity behavior that makes flow of the unformed metal/binder, ceramic/binder, or metal/ceramic/binder difficult.

Many of the characteristics of materials and compositions useful as binders are described in Shanefleld, "Organic Additives and Ceramic Processing," (Kluwer Academic Publishers, Boston 1996). Desirable features include (1) easy burnout, (2) strong adhesion to the powder and good cohesive strength, (3) solubility in fluidizing liquid, and (4) low cost. The binder material must be suitable for a variety of process conditions, since, for example, many powders must avoid exposure to air or water, or may require exposure to reducing gases or vacuum conditions, during processing.

It is therefore an object of this invention to provide molding compositions having improved binder removal characteristics.

It is another object of this invention to provide molding compositions suitable for use in a wide range of processing conditions.

SUMMARY OF THE INVENTION

Molding compositions including polyhydroxyalkanoates are provided. The use of polyhydroxyalkanoates as a binder in molding compositions provides improved binder removal in the finished molded product, and offers a wide range of physical properties suitable for use in a variety of processing conditions. The composition preferably includes a powdered material, such as a metal powder, ceramic powder, or blend, admixed with a polyhydroxyalkanoate binder. The compositions are useful in powder processing techniques, such as injection molding, slip casting, tape casting, or extrusion.

DETAILED DESCRIPTION OF THE INVENTION

Polyhydroxyalkanoate binders for use in molding compositions are provided, preferably for use in metal powder, ceramic powder, or metal/ceramic powder processing.

I. PHA Molding Compositions

The molding compositions generally include one or more powdered materials and one or more polyhydroxyalkanoates or a solution thereof. The compositions may include additional (optional) components to enhance processing or properties of the end product.

1. Powdered Material

The powdered material of the molding compositions disclosed herein can be selected from glasses, ceramics, metals, alloys, thermoplastic polymers, and combinations thereof. Metal powder, ceramic powder, and blends of metal and ceramic powder are preferred. Powder materials useful in the molding compositions disclosed herein are described in German, "Powder Injection Molding," (Metal Powder Industries Federation, Princeton, N.J. 1990) and German and Bose, "Injection Molding of Metals and Ceramics," (Metal Powder Industries Federation, Princeton, N.J. 1997).

The term "powdered" as used throughout this disclosure refers to the form of the material prior to mixing it into the composition to be molded, and is understood to include microparticles, microspheres, nanoparticles, flakes, and other particles of a size suitable for molding into larger products.

The amount of powdered material present in the molding composition preferably is between about 50% and 99.999%, and more preferably between about 70% and 99.999%, of the total dry weight of the composition. The particular material, form of the material, and fraction of material present in the composition can be readily selected by those of skill in the art based, for example, on the desired physical properties of the end product and the particular molding process to be employed.

2. Polyhydroxyalkanoate Binder

Several types of polyhydroxyalkanoates (PHAs) are known. It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics; PHAs with long side chains are more elastomeric. The former polymers have been known for about seventy years (Lemoigne & Roukhelman 1925), while the latter polymers are a relatively recent discovery (deSmet, et al., *J. Bacteriol.*, 154:870–78 (1983)). Before this designation, however, PHAs of microbial origin containing both R-3-hydroxybutyric acid units and longer side chain units from C5 to C16 were identified (Wallen & Rowheder, *Environ. Sci. Technol.*, 8:576–79 (1974)). A number of bacteria which produce copolymers of D-3-hydroxybutyric acid and one or more long side chain hydroxyacid units containing from five to sixteen carbon atoms have been identified more recently (Steinbuchel & Wiese, *Appl. Microbiol. Biotechnol.*, 37:691–97 (1992); Valentin et al., *Appl. Microbiol. Biotechnol.*, 36: 507–14 (1992); Valentin et al., *Appl. Microbiol. Biotechnol.*, 40:710–16 (1994); Abe et al., *Int. J. Biol. Macromol.*, 16:115–19 (1994); Lee et al., *Appl. Microbiol. Biotechnol.*, 42:901–09 (1995); Kato et al., *Appl. Microbiol. Biotechnol.*, 45:363–70 (1996); Valentin et al., *Appl. Microbiol. Biotechnol.*, 46:261–67 (1996); U.S. Pat. No. 4,876,331 to Doi). Useful examples of specific two-component copolymers include PHB-co-3-hydroxyhexanoate (Brandl et al., *Int. J. Biol. Macromol.*, 11:49–55 (1989); Amos & McInerey, *Arch. Microbiol.*, 155:103–06 (1991); U.S. Pat. No. 5,292,860 to Shiotani et al.). Chemical synthetic methods have also been applied to prepare racemic PHB copolymers of this type for applications testing (WO 95/20614, WO 95/20615, and WO 96/20621).

As PHAs have become increasingly available, they have been examined for their suitability in applications where they serve as a processing aid. For example, the use of PHA latex film in the production of CRT tube components is described in WO 96/17369.

A. Polymer Formulas

Suitable molecular weights of the polymers are between about 10,000 and 4 million Daltons. Preferable molecular weights are between about 50,000 and 1.5 million Daltons. The PHAs preferably contain one or more units of the following formula:

—$OCR^1R^2(CR^3R^4)_nCO$— wherein n is 0 or an integer; and
wherein $R^1$, $R^2$, $R^3$, and $R^4$ are independently selected from saturated and unsaturated hydrocarbon radicals, halo- and hydroxy-substituted radicals, hydroxy radicals, halogen radicals, nitrogen-substituted radicals, oxygen-substituted radicals, and hydrogen atoms.

Suitable monomeric units include hydroxybutyrate, hydroxyvalerate, hydroxyhexanoate, hydroxyheptanoate, hydroxyoctanoate, hydroxynonanoate, hydroxydecanoate, hydroxyundecanoate, and hydroxydodecanoate units. PHAs including monomers and polymers and derivatives of 3-hydroxyacids, 4-hydroxyacids and 5-hydroxyacids can be used. Representative PHAs are described in Steinbüchel & Valentin, *FEMS Microbiol. Lett.*, 128:219–28 (1995).

B. Preparation of Polyhydroxyalkanoates

The PHAs can be prepared from a biological source such as a microorganism which naturally produces the PHAs or which can be induced to produce the PHAs by manipulation of culture conditions and feedstocks, or microorganisms or a higher organism such as a plant, which has been genetically engineered so that it produces PHAs.

Methods which can be used for producing PHA polymers from microorganisms which naturally produce polyhydroxyalkanoates are described in U.S. Pat. No. 4,910,145 to Holmes, et al.; Byrom, "Miscellaneous Biomaterials" in *Biomaterials* (Byrom, ed.) pp. 333–59 (MacMillan Publishers, London 1991); Hocking and Marchessault, "Biopolyesters" in Chemistry and Technology of Biodegradable Polymers (Griffin, ed.) pp. 48–96 (Chapman & Hall, London 1994); Holmes, "Biologically Produced (R)-3-hydroxyalkanoate Polymers and Copolymers" in Developments in *Crystalline Polymers* (Bassett, ed.) vol. 2, pp. 1–65 (Elsevier, London 1988); Lafferty et al., "Microbial Production of Poly-b-hydroxybutyric acid" in Biotechnology (Rehm & Reed, eds.) vol. 66, pp. 135–76 (Verlagsgesellschaft, Weinheim 1988); Müller & Seebach, *Angew. Chem. Int. Ed. Engl.* 32:477–502 (1993).

Methods for producing PHAs in natural or genetically engineered organisms are described by Steinbüchel, "Polyhydroxyalkanoic Acids" in *Biomaterials* (Byrom, ed.) pp. 123–213 (MacMillan Publishers, London 1991); Williams & Peoples, *CHEMTECH*, 26:38–44 (1996); Steinbüchel & Wiese, *Appl. Microbiol. Biotechnol.*, 37:691–97 (1992); U.S. Pat. Nos. 5,245,023; 5,250,430; 5,480,794; 5,512,669; 5,534,432 to Peoples and Sinskey; Agostini et al., *Polym. Sci.*, Part A-1, 9:2775–87 (1971); Gross et al., *Macromolecules*, 21:2657–68 (1988); Dubois, et al., *Macromolecules*, 26:4407–12 (1993); Le Borgne & Spassky, *Polymer*, 30:2312–19 (1989); Tanahashi & Doi, *Macromolecules*, 24:5732–33 (1991); Hori et al., *Macromolecules*, 26:4388–90 (1993); Kemnitzer et al., *Macromolecules*, 26:1221–29 (1993); Hori et al.,

*Macromolecules*, 26:5533–34 (1993); Hocking & Marchessault, Polym. Bull., 30:163–70 (1993); Xie et al., Macromolecules, 30:6997–98 (1997); and U.S. Pat. No. 5,563,239 to Hubbs et al. Other polymer synthesis approaches including direct condensation and ring-opening polymerization of the corresponding lactones are described in Jesudason & Marchessault, *Macromolecules* 27:2595–602 (1994); U.S. Pat. No. 5,286,842 to Kimura; U.S. Pat. No. 5,563,239 to Hubbs et al.; U.S. Pat. No. 5,516,883 to Hori et al.; U.S. Pat. No. 5,461,139 to Gonda et al.; and Canadian Patent Application No. 2,006,508. WO 95/15260 describes the manufacture of PHBV films, and U.S. Pat. Nos. 4,826,493 and 4,880,592 to Martini et al. describe the manufacture of PHB and PHBV films. U.S. Pat. No. 5,292,860 to Shiotani et al. describes the manufacture of the PHA copolymer poly(3-hydroxybutyrate-co-3-hydroxyhexanoate.

C. Form and Selection of PHA Binder

A number of features of the polyhydroxyalkanoate polymers make them particularly attractive as binders for metal powder, ceramic powder or metal/ceramic powder processing. PHA binder formulations can be prepared using PHAs in their solid form, in a latex form, or in solution, for example, dissolved in a solvent such as acetone. PHAs can be plasticized and blended with other polymers or agents.

A variety of PHAs, having a wide range of polymer physical properties, can be produced, depending on the hydroxyacid monomer composition used (Steinbuchel & Valentin, *FEMS Microbiol. Lett.*, 128:219–28 (1995)). The range of properties include, for example, melting temperatures between about 40° C. and 180° C., glass transition temperatures between about −35° C. to 5° C., degrees of crystallinity between about 0% and 80%, and elongation to break between about 5 and 500%. The rate of crystallization can be controlled. Polyhydroxybutyrate, for example, has characteristics similar to those of polypropylene, while polyhydroxyoctanoates (a copolymer of D-3-hydroxyoctanoate and D-3-hydroxyhexanoate) behave more as elastomers, and PHAs with longer side chains have characteristics similar to waxes. The range of PHA polymers available with melting temperatures ranging from 40 to 180° C. provides additional flexibility in shape formation.

PHAs can exist in at least two distinct physical forms, as amorphous granules or as crystalline solids. The tendency of the PHAs to crystallize in terms of both final degree of crystallinity and rates of crystallization also varies with composition. PHA polymers offering rapid crystallization can be used for high green strength. These would include, for example PHB and PHBV, with the latter copolymer exhibiting the unique feature of isodimorphisn. Where higher malleability is desired, PHOs and other longer pendant group types could be used. This polymer class has a lower glass transition temperature, around −35° C. as compared to 5° C. for the PHB homopolymer, allowing them to be formulated as self lubricating. This in turn reduces the need for other additives to obtain suitable flow characteristics for the mixture fed to the shaping system.

One particularly useful form is as a latex of PHA in water. Evaporation of the water as the shapes are molded results in film formation as the PHA granules coalesce providing excellent binding. The PHAs are readily removed by thermal decomposition during the subsequent thermal processing of the shaped parts. The range of PHA polymers available with melting temperatures ranging from 40–180° C. provides additional flexibility in shape formation.

The monomer compositions also affect solubility in organic solvents, allowing the choice of a wide range of solvents. Copolymers of D-3-hydroxybutyrate and other hydroxyacid co-monomers have significantly different solubility characteristics from those of the PHB homopolymer. For example, acetone is not a good solvent for PHB but is very useful for dissolving D-3-hydroxybutyrate copolymers with D-3-hydroxyacids containing from 6 to 12 carbon atoms (Abe et al., *Int. J. Biol. Macromol.* 16:115–19 (1994); Kato et al., *Appl. Microbiol. Biotechnol.*, 45:363–70 (1996)). Mitomo et al., *Reports on Progress in Polymer Physics in Japan*, 37:128–29 (1994), describes the solubility of copolyesters poly(3-hydroxybutyrate-co-4-hydroxybutyrate, containing from 15 to 75 mol. % 4-hydroxybutyrate residues, in acetone. A number of other solvents suitable for a range of PHAs are described in U.S. Pat. No. 5,213,976 to Blauhut et al.; U.S. Pat. No. 4,968,611 to Traussnig; Japan Kokai Tokkyo Koho JP 95,135,985; Japan Kokai Tokkyo Koho JP 95,79,788; WO 93/23554; DE 19533459; WO 97/08931; and Brazil Pedido PI BR 93 02,312.

E. Other Binder Components

PHAs can be plasticized and blended with other polymers or agents. Other, non-microbial, polymers having structures and decomposition temperatures similar to polyhydroxyalkanoates include polylactide (PLA) and polyglycolide (PGA). These polymers can be used in combination with or in place of PHA binders. The production and use of PLA are described extensively by Kharas et al., "Polymers of Lactic Acid" in *Plast. Microbes* (Mobley, ed.) pp. 93–137 (Hanser, Munich, Germany (1994)). The ester oxygens of these polymers, PHAs, PLA, PGA, are polar and provide good bonding between the binder and the powder materials.

3. Additives

Binders used in molding compositions frequently include a blend of other components, such as lubricants, plasticizers, and adhesion agents. The PHA molding compositions disclosed herein can also include such additives. It is also understood that certain PHAs may be used in place of such additives in other compositions.

II. Methods of Using PHA Molding Compositions

The PHA molding compositions can be used in forming techniques known in the art. The de-binding step described below can be adapted for use with these techniques as needed for the particular process, material, and product.

1. Forming Processes

The PHA molding compositions can be used in forming techniques known in the art. These techniques include slip casting, tape casting, extrusion, injection molding, dry pressing and screen printing. These and other powder processing techniques are described in German, "Powder Injection Molding," (Metal Powder Industries Federation, Princeton, N.J. 1990) and German and Bose, "Injection Molding of Metals and Ceramics," (Metal Powder Industries Federation, Princeton, N.J. 1997). Extrusion and injection molding are preferred processes for use with the compositions described herein. One of skill in the art should readily be able to adapt known forming techniques for use with the PHA molding compositions disclosed herein.

2. PHA Binder Removal

The de-binding step preferably includes heating the shaped powder compact to a temperature approaching the decomposition temperature of the polyesters, which is remarkably constant for the PHAs despite varying pendant groups, so that temperature control experience is widely applicable over a range of PHA formulations. The decomposition involves formation of crotonic acid and its homologues. Careful application of heat leading to slightly higher temperatures on the outside of the shaped powder compact causes the PHA powder to decompose so that degassing channels can be formed and subsequent processing can take place without deformation or void formation of the shape due to gas trapping.

In the case of PHAs containing unsaturated monomers, the alkenoic acids can be destroyed by thermal catalytic systems, by combustion, or a combination thereof. The need for air inflow, oxygen, or other oxidants is eliminated or reduced through the use of PHA binders, thereby reducing waste gas emissions and heat loss. Avoidance of oxidants also minimizes undesirable oxidation of components such as metal powders. Alkenoic acids are also compatible with a reducing or inert atmosphere, when exposure to such atmospheres is desired. For example, the use of reducing atmospheres is advantageous when using metal oxides or mixtures comprising metal oxides.

In general, avoidance of the need for protective atmospheres or other gases simplifies the process and protects the constituent materials. The rate of decomposition of the PHA can be controlled more easily than the combustion of other binding materials. Combustion requires diffusion of combustion product from the burning binder and diffusion of oxygen to it entail process control and other complexities that are obviated by the use of the PHA system. In other words, the unpredictable results of combustion are avoided since oxygen penetration into the powder-containing shape is no longer required. The PHA system also avoids carbon residues found in other binder systems containing polyolefin or polystyrene materials, thereby leading to fewer faults and greater strength in the final products.

PHAs may also be removed using a solvent process. A variety of application and processing options are provided, since a range of solvents for PHAs are available. The solvency characteristic of PHAs also allows for their removal from malformed compacts, unused tape, and other process waste, thereby reducing wastage. In addition, the PHAs are made from renewable resources and degradable by enzymatic action produced by microorganisms in, for example, composting systems, providing another means of disposal of waste material.

III. Applications for Using PHA Molding Compositions

Preferred applications include the manufacture of ceramics, lacquers, superconductors, and automotive parts.

In one embodiment, an "ink" or "lacquer" containing low melting temperature and conducting metals or metal oxides can be applied above the melting point of the polymer and the "ink" allowed to solidify if desired to permit additional production steps. The ink and substrate can then be brought to the decomposition temperature of the PHA at which point the PHA decomposes leaving a dense conductive strip. Alternatively, a metal powder/PHA mixture can be applied as a coating or lacquer above the melting temperature of the PHA, allowed to solidify and the PHA removed by thermal decomposition. The use of solvent-based PHA binder formulations will give similar flexibility including the use of aqueous latexes. In another embodiment, a PHA form suitable for extrusion molding can be used as a container for powdered materials, such as the 1-2-3 superconductor, wherein the PHA is removed by thermal decomposition after shaping the powdered material. A particularly useful example is in the manufacture of superconducting tapes or wires using yttrium oxide, barium carbonate, and cupric oxide with subsequent enrichment with oxygen (YBCO). The thin film techniques currently used can only produce YBCO tapes of about one meter in length. The ability to extrude such materials should be useful in manufacturing superconducting films or wires that are hundreds of meters long and commercially suitable.

The compositions and methods of preparation and use thereof described herein are further described by the following non-limiting examples.

EXAMPLE 1

$BaTiO_3$ Disk Made Using PHA Latex Binder

A PHA latex (18% solids, particle size between 0.2 and 1.0 μm), which was prepared from *Pseudomonas putida* cells cultivated on fatty acids, was mixed with $BaTiO_3$ powder (Aldrich, particle size less than 2 μm) at a dry weight ratio of 1:19. The resulting paste was then freeze-dried and further desiccated in a vacuum oven at 120° C. The dried paste was reground and compressed at 40,000 psi in 13 mm die mold to form a round disk. The disk was bisque-fired in air using the following heating profile: (1) heat from ambient to 1125° C. at 3° C./min.; (2) soak at 1125° C. for one hour; and (3) cool to room temperature. The fired disc retained its shape, free of visible cracks or other defects. The measured weight loss of 5% indicated quantitative removal of the polymeric binder.

EXAMPLE 2

$Al_2O_3$ Disk Made Using PHA Latex Binder

A PHA latex (18% solids, particle size between 0.2 and 1.0 μm), which was prepared from Pseudomonas putida cells cultivated on fatty acids, was mixed with $Al_2O_3$ powder (Aldrich, particle size less than 10 μm) at a dry weight ratio of 1:19. The resulting paste was then freeze-dried and further desiccated in a vacuum oven at 120° C. The dried paste was reground and compressed at 40,000 psi in 13 mm die mold to form a round disk. The disk was bisque-fired in air using the following heating profile: (1) heat from ambient to 1125° C. at 3° C./min.; (2) soak at 1125° C. for one hour; and (3) cool to room temperature. The fired disc retained its shape, free of visible cracks or other defects. The measured weight loss of 5% indicated quantitative removal of the polymeric binder.

EXAMPLE 3

$Al_2O_3$ Disk Made Using PHA Binder Solution

PHA purified from *Pseudomonas putida* cells cultivated on fatty acids, was dissolved in acetone to form a 10% wt./vol. solution. The PHA solution was mixed with $Al_2O_3$ powder (Aldrich, particle size less than 10 μm) at a dry weight ratio of 1:19. The resulting paste was then freeze-dried and further desiccated in a vacuum oven at 120°C. The dried paste was reground and compressed at 40,000 psi in 13 mm die mold to form a round disk. The disk was bisque-fired in air using the following heating profile: (1) heat from ambient to 1125° C. at 3° C./min.; (2) soak at 1125° C. for one hour; and (3) cool to room temperature. The fired disc retained its shape, free of visible cracks or other defects. The measured weight loss of 4.4% indicated removal of the polymeric binder.

In a control experiment, omission of the binder solution resulted in a compressed part that disintegrated upon removal from the die mold. Firing of the compressed powder did not affect the weight or appearance of the powder.

EXAMPLE 4

$BaTiO_3$ Disk Made Using PHA Binder Solution

PHA purified from *Pseudomonas putida* cells cultivated on fatty acids, was dissolved in acetone to form a 10% wt./vol. solution. The PHA solution was mixed with $BaTiO_3$ powder (Aldrich, particle size less than 2 μm) at a dry weight ratio of 1:19. The paste was then freeze-dried and further desiccated in a vacuum oven at 120° C. The dried paste was reground and compressed at 40,000 psi in 13 mm die mold to form a round disk. The disk was bisque-fired in air using the following heating profile: (1) heat from ambient to 1125° C. at 3° C./min.; (2) soak at 1125° C. for one hour; and (3) cool to room temperature. The fired disc retained its shape, free of visible cracks or other defects. The measured weight loss of 5% indicated quantitative removal of the polymeric binder.

In a control experiment, omission of the binder solution resulted in a compressed part that disintegrated upon removal from the die mold. Firing of the compressed powder did not affect the weight or appearance of the powder.

EXAMPLE 5

$Al_2O_3$ Disk Made Using PHB Binder

PHB homopolymer was mixed with $Al_2O_3$ powder (Aldrich, particle size less than 10 μm) at a weight ratio of 1:19. The paste was ground and compressed at 40,000 psi in a 13 mm die mold to form a round disk. The disk was bisque-fired in air using the following heating profile: (1) heat from ambient to 1125° C. at 3° C./min.; (2) soak at 1125° C. for one hour; and (3) cool to room temperature. The fired disc retained its shape, free of visible cracks or defects. The measured weight loss of 5% indicated quantitative removal of the polymeric binder.

EXAMPLE 6

$BaTiO_3$ Disk Made Using PHB Binder

PHB was mixed with $BaTiO_3$ powder (Aldrich, particle size less than 2 μm) at a weight ratio of 1:19. The powder mixture was ground and compressed at 40,000 psi in a 13 mm mold to form a round disk. The disk was bisque-fired in air using the following heating profile: (1) heat from ambient to 1125° C. at 3° C./min.; (2) soak at 1125° C. for one hour; and (3) cool to room temperature. The fired disc retained its shape, free of visible cracks or other defects. The measured weight loss of 5% indicated quantitative removal of the polymeric binder.

EXAMPLE 7

$BaTiO_3$ Disk Made Using PHBV Binder in a 1:19 Weight Ratio

PHBV (12% HV content, Aldrich) was mixed with $BaTiO_3$ powder (particle size less than 2 μm, Aldrich) at a weight ratio of 1:19. The powder mixture was ground and compressed at 40,000 psi in a 13 mm die mold to form a round disk. The disk was bisque-fired in air using the following heating profile: (1) heat from ambient to 1125° C. at 3° C./min.; (2) soak at 1125° C. for one hour; and (3) cool to room temperature. The fired disk retained its shape, free of visible cracks or defects. The measured weight loss of 4% indicated removal of the polymeric binder.

EXAMPLE 8

$BaTiO_3$ Bar Made Using PHBV Binder in a 1:4 Weight Ratio

PHBV (12% HV content, Aldrich) was mixed with $BaTiO_3$ powder (particle size less than 2 μm, Aldrich) at a weight ratio of 1:4. The powder mixture was ground and compressed at 12,000 psi in a die mold at 175° C. to form a rectangular bar. The bar was bisque-fired in air using the following heating profile: (1) heat from ambient to 1125° C. at 3° C./min.; (2) soak at 1125° C. for one hour; and (3) cool to room temperature. The fired bar retained its shape with some visible pits. The measured weight loss of 18.6% indicated removal of the polymeric binder.

EXAMPLE 9

Gold Film Made Using PHA Latex Binder 100 mg gold powder (Aldrich, 1.5 to 3.0 μm, spherical) and 0.16 mg sodium carboxymethylcellulose (Aldrich, 3,000–6,000 cP at 1% in water) were added to a PHA latex (0.028 mL, 18% solids, particle size between 0.2 and 1.0 μm) prepared from *Pseudomonas putida* cells cultivated on fatty acids. The resulting mixture was painted in a stenciled pattern onto a slightly porous white ceramic tile (25×50×0.5 mm). The painted tile then was bisque-fired in air using the following heating profile: (1) heat from ambient to 750° C. at 10° C./min.; (2) soak at 750° C. for one hour; and (3) cool to room temperature. Following cooling, the gold particles were found to be sintered to form a coherent film attached to the ceramic support. The film was electrically conductive, as evidenced by a measured resistance of less than 0.5 ohm across a 1 cm gap.

EXAMPLE 10

Gold Disk Made Using PHA Binder Solution

Gold powder (4.75 g, 0.8 to 1.5 μm spherical, Alfa Aesar) was combined with a solution of PHA (0.0975 g, from *Pseudomonas putida* cells cultured on fatty acids) dissolved in acetone (0.9 mL). The slurry was dried in a warm oven and then further dried in vacuo at 75° C. The dried mixture was compressed into a 1 cm disk using a die mold (40,000 psi, 1 min.). The green part was then bisque-fired using the following heating profile: (1) heat from ambient to 750° C. at 3° C./min.; (2) soak for 2 hours at 750° C.; and (3) cool to room temperature. The final product was an intact, lustrous gold disk. Weight loss indicated 99.7% complete removal of the polymer binder.

Modifications and variations of the polymer compositions and methods of preparation and use thereof will be obvious to those skilled in the art from the foregoing detailed description. Such modifications and variations are intended to come within the scope of the appended claims.

We claim:

1. A method of a forming shaped product, the method comprising
    molding a composition comprising a powdered material admixed with at least one thermally decomposable polyhydroxyalkanoate or a solution thereof to form the shaped product, and
    heating the shaped product to remove essentially all of the polyhydroxyalkanoate from the product, wherein heating of the shaped product is conducted in an atmosphere substantially free of oxidants.

2. The method of claim 1 wherein the polyhydroxyalkanoate contains unsaturated monomers.

3. The method of claim 1 wherein the heating is conducted in an inert or reducing atmosphere.

4. The method of claim 3 wherein the powdered material comprises metal oxides.

5. The method of claim 1 wherein the polyhydroxyalkanoate is selected from the group consisting of polyhydroxybutyrate, polyhydroxybutyrate-co-hydroxyvalerate, polyhydroxybutyrate-co-4-hydroxybutyrate, polyhydroxybutyrate-co-3-hydroxyhexanoate, polyhydroxybutyrate-co-3-hydroxyheptanoate, and polyhydroxybutyrate-co-3-hydroxyoctanoate.

6. The method of claim 1 wherein the polyhydroxyalkanoate is poly-3-hydroxybutyrate.

7. The method of claim 1 wherein the polyhydroxyalkanoate is poly-3-hydroxypropionate.

8. The method of claim 1 wherein the polyhydroxyalkanoate is poly-3-hydroxyoctanoate-co-3-hydroxyhexanoate.

9. The method of claim 1 wherein the powdered material is selected from the group consisting of glass, ceramics, metals, alloys, and mixtures thereof.

10. The method of claim 1 wherein the method of forming shaped products is selected from the group consisting of slip casting, tape casting, extrusion, injection molding, dry pressing, and screen printing.

11. The method of claim 1 wherein the shaped product is an extruded or cast tape.

12. The method of claim 11 wherein the powdered material is a ceramic.

13. A molded article formed by a method comprising molding a composition comprising a powdered material admixed with at least one thermally decomposable polyhydroxyalkanoate or a solution thereof, and heating the shaped product to remove essentially all of the polyhydroxyalkanoate from the product, wherein heating of the shaped product is conducted in an atmosphere substantially free of oxidants.

14. The molded article of claim 13 wherein the powdered material is present in an amount between about 70% and 99.999% by weight based on total dry weight of the composition.

15. The molded article of claim 13 wherein the heating is conducted in an inert or reducing atmosphere.

16. The molded article of claim 15 wherein the powdered material comprises metal oxides.

* * * * *